United States Patent
Ishii et al.

(10) Patent No.: US 9,259,990 B2
(45) Date of Patent: Feb. 16, 2016

(54) VEHICLE HEATING SYSTEM

(75) Inventors: Shigeharu Ishii, Okazaki (JP);
Hisafumi Doi, Anjo (JP); Makoto Katsuki, Nagoya (JP); Shinsaku Tomita, Owariasahi (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 484 days.

(21) Appl. No.: 13/295,837

(22) Filed: Nov. 14, 2011

(65) Prior Publication Data

US 2012/0145804 A1 Jun. 14, 2012

(30) Foreign Application Priority Data

Dec. 13, 2010 (JP) .................................. 2010-276877

(51) Int. Cl.
B60H 1/00 (2006.01)
B60H 1/03 (2006.01)

(52) U.S. Cl.
CPC ............ B60H 1/00485 (2013.01); B60H 1/034 (2013.01)

(58) Field of Classification Search
CPC ............... B60H 1/00485; B60H 1/034; B60H 1/00885; B60H 2001/00935
USPC ..................................................... 237/12.3 R
See application file for complete search history.

(56) References Cited

U.S. PATENT DOCUMENTS

| | | | | |
|---|---|---|---|---|
| 4,883,082 A * | 11/1989 | Pirkle | ............................... | 237/80 |
| 5,174,254 A * | 12/1992 | Humburg | .................. | 237/12.3 C |
| 6,454,180 B2 * | 9/2002 | Matsunaga et al. | ...... | 237/12.3 B |
| 6,668,766 B1 * | 12/2003 | Liederman et al. | ......... | 123/41.44 |
| 7,520,320 B2 * | 4/2009 | Itoh et al. | .................. | 237/12.3 B |
| 8,066,197 B2 * | 11/2011 | Sheppard | ..................... | 236/93 R |
| 8,534,571 B2 * | 9/2013 | Schwartz et al. | ......... | 237/12.3 B |

(Continued)

FOREIGN PATENT DOCUMENTS

| DE | 34 47 182 A1 | 6/1986 |
|---|---|---|
| DE | 197 30 678 A1 | 1/1999 |

(Continued)

OTHER PUBLICATIONS

Schaefer, DE3447182A1 English machine translation, Jun. 26, 1986.*

(Continued)

*Primary Examiner* — Alissa Tompkins
*Assistant Examiner* — Phillip E Decker
(74) *Attorney, Agent, or Firm* — Birch, Stewart, Kolasch & Birch, LLP

(57) ABSTRACT

A vehicle heating system comprising: a coolant circuit that circulates coolant between an engine and a heater core; heating device that heats coolant, which is interposed in the coolant circuit; a pump for coolant circulation, which is interposed in the coolant circuit; and a switching valve that switches the coolant flowing through the coolant circuit between a heater-core-side circuit that circuits the coolant among the heater core, the pump and the heating device and an engine-side circuit that circulates the coolant into the engine, wherein the switching valve has a thermo valve that switches channels so that the coolant coming from the engine-side circuit enters either one of the heater-core-side circuit and the engine-side circuit according to temperature of the coolant, and a bypass that delivers the coolant, which comes from the heater-core-side circuit, to the heater-core-side circuit.

4 Claims, 3 Drawing Sheets

(56) References Cited

U.S. PATENT DOCUMENTS

| | | | |
|---|---|---|---|
| 2002/0029755 A1* | 3/2002 | Ito et al. | 701/113 |
| 2003/0182955 A1* | 10/2003 | Hirao et al. | 62/202 |
| 2004/0050944 A1* | 3/2004 | Matsunaga et al. | 237/12.3 B |
| 2006/0086816 A1* | 4/2006 | Schwartz et al. | 237/12.3 R |
| 2006/0108435 A1* | 5/2006 | Kozdras et al. | 236/93 R |
| 2009/0283604 A1* | 11/2009 | Martinchick et al. | 237/12.3 B |
| 2010/0181516 A1* | 7/2010 | Palanchon | G05D 23/022 251/324 |

FOREIGN PATENT DOCUMENTS

| | | | | | |
|---|---|---|---|---|---|
| EP | 2196649 A1 | * | 6/2010 | | F01P 3/20 |
| JP | 57138409 A | * | 8/1982 | | B60H 1/08 |
| JP | 61-215115 A | | 9/1986 | | |
| JP | 7-172150 A | | 7/1995 | | |
| JP | 10109526 A | * | 4/1998 | | B60H 1/08 |
| JP | 10-309933 A | | 11/1998 | | |
| JP | 2000-108640 A | | 4/2000 | | |
| JP | 2000-108645 A | | 4/2000 | | |
| JP | 2004-322887 A | | 11/2004 | | |
| JP | 2007182857 A | * | 7/2007 | | F01P 5/10 |
| JP | 2007-223418 A | | 9/2007 | | |
| JP | 2008-49876 A | | 3/2008 | | |
| JP | 2010159006 A | * | 7/2010 | | |

OTHER PUBLICATIONS

Orihara, JP2000-108645 A English machine translation, Apr. 18, 2000.*

European Search Report mailed Apr. 18, 2012.

* cited by examiner

VEHICLE HEATING SYSTEM

BACKGROUND OF THE INVENTION

1. Field of the Invention

The present invention relates to a vehicle heating system, and more specifically, to a vehicle heating system with coolant-heating device.

2. Description of the Related Art

For the purpose of securing heating performance in vehicles including hybrid vehicles, idling-stop vehicles, etc., vehicle heating systems have been developed, which have a heating device, such as an electric heater, for heating the coolant to be introduced into a heater core.

These vehicle heating systems are equipped with a heating device and an electric pump in a coolant circuit running through the engine and the heater core so that heating may be carried out during engine shutdown. For a quick heating performance during the engine's cold state, some of these systems are further equipped with a four-way valve for switching coolant routes to prevent the coolant circulating the heater core from entering the engine. The four-way valve is actuated by a control unit and is switched on or off according to room or outside temperature (Unexamined Japanese Patent Application No. 2000-108645).

The four-way valve mentioned in the publication, however, is of an electric type like an electromagnetic valve or a motor-operated switching valve, which is relatively expensive. On top of that, the actuation of the four-way valve requires a control unit and a temperature sensor, and thus overall increases the cost of the heating system. Furthermore, since the four-way valve is designed to switch the coolant routes according to room or outside temperature detected by the temperature sensor, it is difficult to properly grasp engine temperature and reflect the engine temperature to the heating control. For instance, when the room temperature is low, the valve is switched to the route that does not lead the coolant circulating the heater core into the engine. In this case, once the room temperature is increased with a quick heating effect, the coolant circulating the heater core is switched to the route running to the engine side. At this point, if the engine is in a cold state, there is the possibility of loss of heating performance as the coolant refrigerated in the engine circulates into the heater core.

SUMMARY OF THE INVENTION

It is an object of the present invention to provide a vehicle heating system that performs efficient heating control, reduce the cost of a four-way valve for switching coolant paths, and design the entire heating system with a simple and inexpensive configuration.

In order to achieve the object, the invention is a vehicle heating system comprising: a coolant circuit that circulates coolant between an engine and a heater core; heating device that heats coolant, which is interposed in the coolant circuit; a pump for coolant circulation, which is interposed in the coolant circuit; and a switching valve that switches the coolant flowing through the coolant circuit between a heater-core-side circuit that circuits the coolant among the heater core, the pump and the heating device and an engine-side circuit that circulates the coolant into the engine, wherein the switching valve has a thermo valve that switches channels so that the coolant coming from the engine-side circuit enters either one of the heater-core-side circuit and the engine-side circuit according to temperature of the coolant, and a bypass that returns the coolant, which comes from the heater-core-side circuit, to the heater-core-side circuit; and when the channels are switched so that the coolant coming from the engine-side circuit enters the engine-side circuit, the thermo valve blocks the coolant, which comes from the engine-side circuit, from entering the heater-core-side circuit.

When the engine temperature is low as seen at cold start, the coolant heated by the heater can be delivered through the bypass into the heater-core-side circuit without passing through the engine by using the switching valve to divide the coolant circuit into the heater-core-side circuit that circulates the coolant among the heater core, the pump and the heating device and the engine-side circuit that circulates the coolant into the engine, and by using the thermo valve to switch the channels according to the temperature of the coolant coming from the engine-side circuit. It is therefore possible to harvest heat from the heater core without reducing the coolant temperature and obtain heating performance quickly.

Since the thermo valve carries out the switching of the coolant circuit based upon the coolant temperature, it is not necessary to install drive device, such as an electromagnetic solenoid and a motor, for switching the valve, and the switching valve can be configured at low cost. It is also not necessary to provide a controller that controls the drive device for switching the valve, a sensor that detects temperature, etc. Consequently, the heating system overall is simply and inexpensively configured.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

An embodiment of the invention will be described below with reference to the attached drawings.

Figure 1:
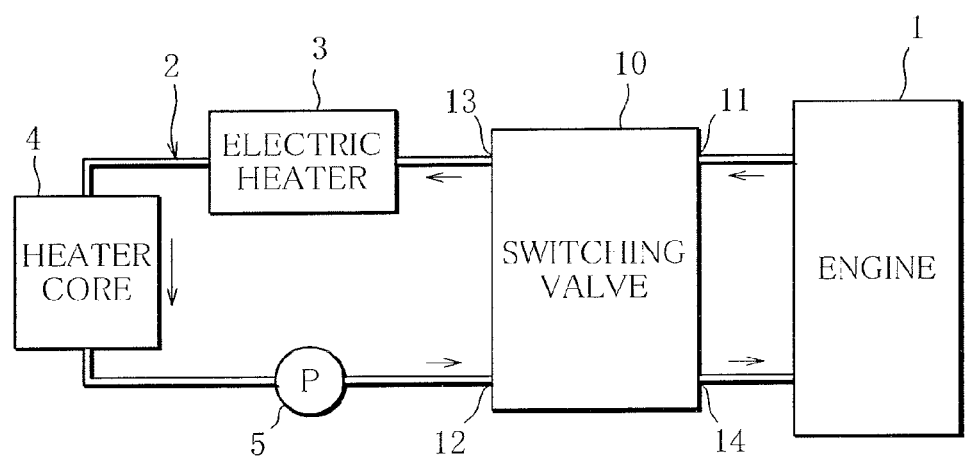
FIG. 1 is a schematic configuration diagram of a vehicle heating system according to one embodiment of the invention.

FIG. 1 is a schematic configuration view of a vehicle heating system according to one embodiment of the invention.

As illustrated in FIG. 1, according to the embodiment, an electric heater 3 (heating device), a heater core 4 and an electric pump 5 are interposed in a coolant circuit 2 of an engine 1 in the order named in a direction that coolant flows.

The electric heater 3 can be actuated even during shutdown of the engine 1 and is capable of heating the coolant in the coolant circuit 2. The heater core 4 harvests thermal energy from the coolant and performs heat exchange with air to be supplied into the vehicle, to thereby heat the air. The electric pump 5 circulates the coolant in the coolant circuit 2.

The coolant circuit 2 is provided with a switching valve 10. The switching valve 10 has two inlets 11 and 12 and two outlets 13 and 14, and functions to switch the coolant circuit 2. Between the two inlets 11 and 12 of the switching valve 10, the first inlet 11 is connected to a coolant outlet of the engine 1, and the second inlet 12 to an outlet of the electric pump 5. Between the two outlets 13 and 14 of the switching valve 10, the first outlet 13 is connected to an inflow port of the electric heater 3, and the second outlet 14 to a coolant inlet of the engine 1.

Figure 2A:
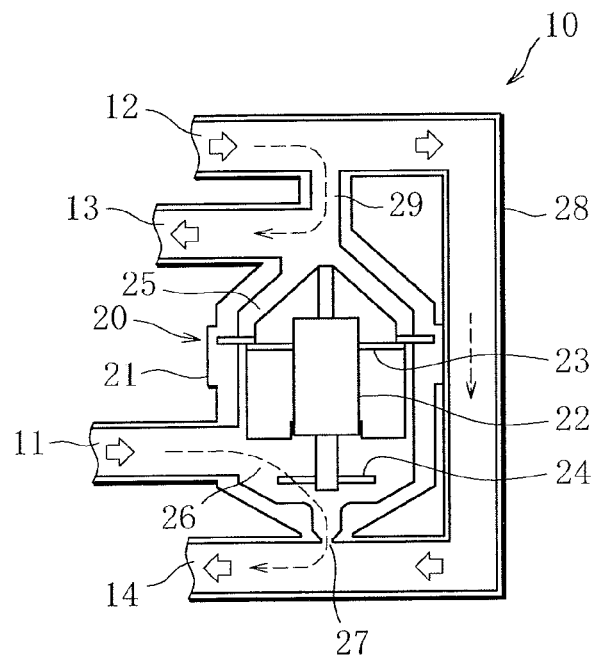
FIG. 2A shows a detailed interior configuration of a switching valve when coolant temperature is low, and FIG. 2B when the coolant temperature is high.
Figure 2B:
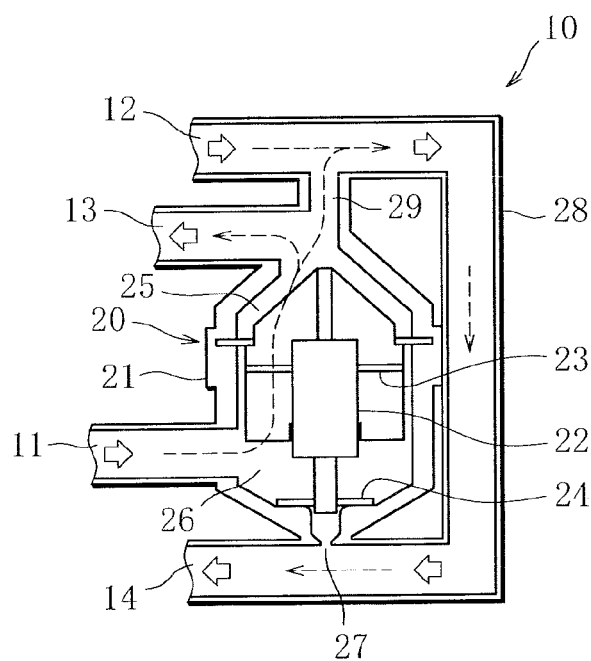

FIG. 2A shows a detailed interior configuration of the switching valve 10 when coolant temperature is low, and FIG. 2B when the coolant temperature is high.

The switching valve 10 has a thermo valve 20 that is open or closed according to the coolant temperature. As shown in FIG. 2, the thermo valve 20 is provided with a casing 21 whose interior space is substantially column-shaped and a shaft 22 that is movable within the casing 21 in an axial direction (vertical direction as viewed in FIG. 2). The shaft 22 is equipped with a first valve element 23 in an upper part thereof and a second valve element 24 at a lower end thereof. The interior space of the casing 21 is divided by the first valve element 23 into two, that is, an upper space 25 and a lower space 26. As shown in FIG. 2A, when the shaft 22 is located on the upper side, the upper space 25 and the lower space 26 are separated by the first valve element 23. As shown in FIG. 2B, when the shaft 22 is located on the lower side, the upper space 25 and the lower space 26 open into each other.

The first inlet 11 leading to the lower space 26 is formed in a peripheral wall of the casing 21, and a first outlet 13 leading to the upper space 25 is formed in an upper part of the casing 21. A valve port 27 opening into the second outlet 14 is formed in a lower part of the casing 21. The valve port 27 is open/closed by the second valve element 24.

The shaft 22 includes a built-in temperature sensor, not shown, and moves in the axial direction according to the temperature of the coolant stored in the lower space 26. The shaft 22 moves upwards at low coolant temperature and downwards at high coolant temperature, as viewed in FIG. 2.

The switching valve 10 is further provided with a lead-in path 28 linking the second inlet 12 and the second outlet 14. The switching valve 10 further includes a bypass 29 linking the second inlet 12 and the upper space 25.

As shown in FIG. 2A, when the shaft 22 moves upwards as viewed in the drawing due to a decrease in coolant temperature, the second valve element 24 is detached away from and opens the valve port 27, connecting the first inlet 11 and the second outlet 14 to each other. At the same time, the upper space 25 and the lower space 26 in the casing 21 are separated from each other by the first valve element 23, disconnecting the first inlet 11 and the first outlet 13 from each other.

As shown in FIG. 2B, when the shaft 22 moves downwards as viewed in the drawing due to an increase in coolant temperature, the valve port 27 is closed by the second valve element 24. Simultaneously, the first valve element 23 is open, making the upper space 25 and the lower space 26 in the casing 21 open into each other, and connecting the first inlet 11 and the first outlet 13 to each other.

Figure 3:
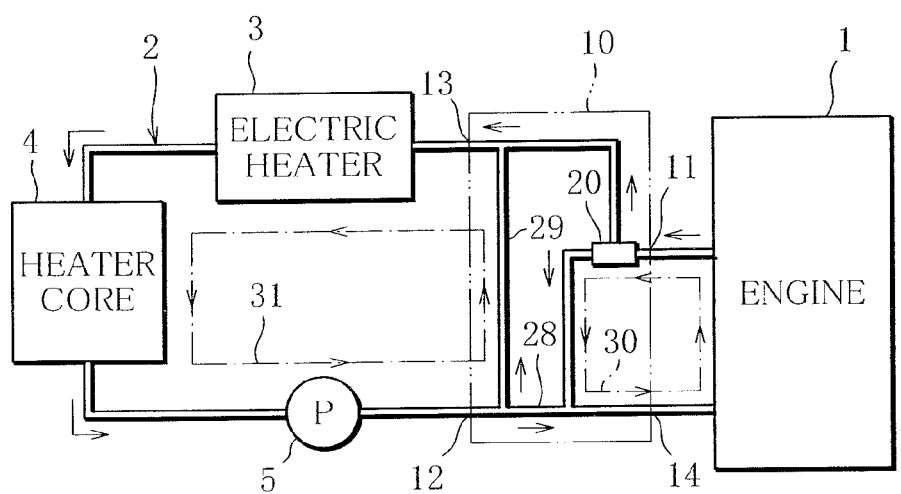
FIG. 3 is a configuration diagram of the vehicle heating system, showing the configuration of the switching valve.

FIG. 3 is a configuration diagram of the vehicle heating system, showing the construction of the switching valve 10.

Since the embodiment constructs the switching valve 10 in the above-described manner, the coolant coming from the engine 1 into the first inlet 11 is switched between the inflow into the first outlet 13 side, namely, into the electric heater 3, and the returning to the second outlet 14 side, namely, to the engine 1.

The coolant coming from the second inlet 12 is discharged from the second outlet 14 through the lead-in path 28 and returns to the coolant inlet of the engine 1.

Since the bypass 29 links the second inlet 12 and the first outlet 13, even if the first inlet 11 and the first outlet 13 are disconnected from each other, the coolant coming from the second inlet 12 can be supplied to the first outlet 13 by passing through the bypass 29.

Consequently, when the coolant coming from the engine 1 has low temperature, there are created a circuit 30 (engine-side circuit) in which the coolant from the engine 1 is returned to the engine 1 by the thermo valve 20 without passing through the heater core 4, and a coolant circuit 31 (heater-core-side circuit) that is provided with the electric heater 3, the heater core 4 and the electric pump 5, and does not run through the engine 1. When the temperature of the coolant coming from the engine 1 is decreased as seen right after startup, the coolant heated by the electric heater 3 does not pass through the engine 1 and is introduced into the heater core 4 while the decrease of the coolant temperature is prevented. This makes it possible to harvest heat from the heater core 4 and immediately raise the coolant temperature.

When the coolant coming from the engine 1 has high temperature, the coolant delivered from the engine 1 is caused to enter the heater core 4 side by the thermo valve 20. The heat of the coolant discharged from the engine 1 can therefore be harvested from the heater core 4. It is then possible to achieve the heating that applies the heat of the engine 1.

Since the switching of the coolant circuit 2 based upon the coolant temperature is carried out by the thermo valve 20, it is not necessary to provide any drive device, such as an electromagnetic solenoid, a motor, etc., for switching the valve. For that reason, the switching valve 10 can be constructed at low cost. It is also not necessary to provide a controller that controls the drive device for switching the valve, a sensor that detects temperature, etc. Consequently, the heating system overall is simply and inexpensively configured.

After passing through the heater core 4 and entering the second inlet 12, the coolant passes through the lead-in path 28 and is discharged from the second outlet 14. The coolant is subsequently introduced into the engine side, regardless of the switching of the thermo valve 20. On this account, when the shaft 22 of the thermo valve 20 moves upwards and creates the coolant circuit 31 that does not run through the engine 1, even if the coolant circulating through the circuit 31 is increased in temperature to expand by the heating of the electric heater 3 or the like, water leakage from the circuit 31 can be prevented by introducing the coolant into the engine 1 side through the lead-in path 28.

The embodiment actuates the electric pump 5 during the heating of the vehicle and stops the electric pump 5 during the cooling of the vehicle.

In the present embodiment, the first outlet 13 and the second inlet 12 are constantly linked to each other through the bypass 29. For that reason, if the electric pump 5 is at rest when the shaft 22 moves downwards due to the increase of the coolant temperature, the fluid pressure of the coolant existing in the lead-in path 28 is decreased. As a result, part of the coolant that has come from the first inlet 11 is returned to the engine 1 through the bypass 29 and the lead-in path 28. This causes the possibility that the coolant passing through the heater core 4 is decreased in flow volume, and heating efficiency is therefore deteriorated. However, if the electric pump 5 is actuated during heating as mentioned above, a sufficient flow volume of the coolant passing through the heater core 4 can be retained, and the heating efficiency is secured.

During the cooling of the vehicle, when the shaft 22 moves downwards due to an increase in coolant temperature, the flow volume of the coolant existing in the lead-in path 28 is decreased by stopping the electric pump 5. This way, the coolant that has come from the first inlet 11 is actively returned to the engine 1 through the bypass 29. The high-temperature coolant is therefore prevented from passing through the heater core 4, which discourages the generation of hot air from the heater core 4. This consequently prevents deterioration in cooling performance.

What is claimed is:

1. A vehicle heating system comprising:
   a coolant circuit that circulates coolant between an engine and a heater core;
   a heating device that heats coolant, which is interposed in the coolant circuit;
   a pump for coolant circulation, which is interposed in the coolant circuit; and
   a switching valve that switches the coolant flowing through the coolant circuit between a heater-core-side circuit that circulates the coolant among the heater core, the pump and the heating device and an engine-side circuit that circulates the coolant into the engine, wherein
   the switching valve has a first inlet to which the coolant from the engine-side circuit flows, a second inlet to which the coolant from the heater-core side circuit flows, a first outlet from which the coolant to the heater-core side circuit flows, a second outlet from which the coolant to the engine-side circuit flows, a bypass that connects the second inlet to the first outlet, a valve port that connects the first inlet to the second outlet, an upper space and a lower space that connects the first inlet to the first outlet and the second inlet, and a thermo valve having a first valve element and a second valve element, such that when the thermo valve is in a first position, the first valve element disconnects the upper space from the lower space and the second valve element opens the valve port, and when the thermo valve is in a second position, the first valve element connects the upper and lower spaces and the second valve element closes the valve port;
   wherein, when the switching valve is in the first position, the coolant from the engine-side circuit enters the engine-side circuit only through the valve port, the first valve element blocks the coolant from the engine-side circuit, from entering the heater-core-side circuit through the upper and lower spaces, and the coolant from the heater-core-side circuit is returned to the engine-side circuit and the heater-core-side circuit through the bypass, and
   wherein, when the switching valve is in the second position, the coolant from the engine-side circuit enters the heater-core-side circuit and the engine-side circuit through the upper and lower spaces, the coolant from the heater-core-side circuit enters the engine-side circuit, and the coolant from the engine-side circuit is prohibited from entering the engine side circuit through the valve port.

2. The vehicle heating system according to claim 1, wherein:
   the switching valve has a lead-in path that connects the second inlet to the second outlet, such that coolant from the heater-core side circuit is introduced to the engine-side circuit regardless of the position of the thermo valve.

3. The vehicle heating system according to claim 2, wherein:
   the bypass diverges from the lead-in path; and
   if the thermo valve is switched to the second position, the coolant from the engine-side circuit enters the heater-core-side circuit through the upper and lower spaces, and the coolant from the engine-side circuit is returned to the engine-side circuit through upper and lower spaces, the bypass and the lead-in path.

4. The vehicle heating system according to claim 1, wherein:
   the thermo valve has a shaft that includes a built-in temperature sensor.

\* \* \* \* \*